United States Patent [19]

Roser

[11] Patent Number: 5,026,566

[45] Date of Patent: * Jun. 25, 1991

[54] DRIED FOOD CONTAINING TREHALOSE AND METHOD FOR PREPARING SAME

[75] Inventor: Bruce J. Roser, Cambridgeshire, Great Britain

[73] Assignee: Quadrant Bioresources, Limited, Cambridge, United Kingdom

[*] Notice: The portion of the term of this patent subsequent to Jan. 2, 2007 has been disclaimed.

[21] Appl. No.: 327,187

[22] PCT Filed: Jun. 29, 1988

[86] PCT No.: PCT/GB88/00511

§ 371 Date: May 1, 1989

§ 102(e) Date: May 1, 1989

[87] PCT Pub. No.: WO89/00012

PCT Pub. Date: Jan. 12, 1989

[30] Foreign Application Priority Data

Jun. 29, 1987 [GB] United Kingdom ................ 8715238

[51] Int. Cl.$^5$ .......................... A23B 4/03; A23C 1/14; A23L 1/32
[52] U.S. Cl. .................................... 426/443; 426/588; 426/580; 426/599; 426/614; 426/639; 426/640
[58] Field of Search ............... 426/443, 588, 580, 599, 426/614, 639, 640

[56] References Cited

U.S. PATENT DOCUMENTS

| | | | |
|---|---|---|---|
| 1,925,441 | 1/1927 | Finley | 426/580 |
| 3,170,804 | 2/1965 | Kline et al. | 426/614 |
| 4,891,319 | 1/1990 | Roser | 435/188 |

FOREIGN PATENT DOCUMENTS

86/01103 2/1986 World Int. Prop. O. .

OTHER PUBLICATIONS

Peterson et al., 1985, Encyclopedia of Food Science, Avi Publishing Co., Westport, Conn., pp. 303–305.
Webster's Ninth New Collegiate Dictionary, 1985, Merriam-Webster, Publishers, Springfield, Mass., p. 480.

Primary Examiner—Marianne Cintins
Assistant Examiner—Helen Pratt
Attorney, Agent, or Firm—Henry D. Coleman; R. Neil Sudol

[57] ABSTRACT

A method of drying a water-containing foodstuff or beverage at a temperature above ambient, is characterized by incorporating trehalose into the foodstuff or beverage which is to be dried.

7 Claims, No Drawings

DRIED FOOD CONTAINING TREHALOSE AND METHOD FOR PREPARING SAME

The present invention relates to the protection of food against denaturing on being dried at elevated temperatures.

Foodstuffs containing proteins o protein-related materials derived from cell walls, are difficult to preserve by drying at above ambient temperatures while retaining their original quality For example, whole milk contains a range of proteins including acid precipitatable phospho proteins/caseins, immunoglobulins, lactoglobulins and albumin. These proteins tend to be denatured when fresh milk is heated, for example giving rise to the characteristic skin formed on hot milk. Spray drying of milk concentrates degrades these proteins, providing a powdered product which, when reconstituted, does not closely resemble fresh milk. Instead, it has an inferior flavor, it loses its ability to clot with rennin and tends to coagulate in the presence of very hot water.

In the spray drying of milk, concentrates sweetened with sucrose are known to cause even more difficulties as the extra viscosity and "stickiness" causes the concentrate to adhere to the surfaces of the dryer.

Similarly, eggs, especially whole egg, contain a range of lipids and lipoproteins which become denatured on heating. One of the main problems caused by denaturing of egg protein is that the reconstituted egg loses the ability to be whipped into a stable foam. In addition, breakdown of the protein structure also breaks the natural emulsion and fat separates as discrete droplets. Dried egg cannot thus be reconstituted with water to produce a genuinely egg-like substance. Various additives have been proposed in order to maintain the whipping power of reconstituted egg, typically polyphosphates and surfactants. It is also been proposed to add sucrose or a dextrose source such as corn syrup or corn syrup solids (U.S. Pat. No. 3162540). Sucrose is added at the surprisingly high level of 10% which provides an extremely sweet substance. This is acceptable if the egg is to be used in the manufacture of cakes and confectionery but would be completely unacceptable in other uses.

A further problem of degradation occurs in the production of instant coffee, where ground coffee solids are extracted at high temperatures (e.g. 120° C.) with water to produce an extract having typically, 30 to 60% solids which is then spray dried to form a powder. The protein content of the final powder is about 14%. The high temperature extraction and subsequent spray drying inevitably lead to a product which has harsh bitter flavors as compared with fresh ground coffee extracted at below 100° C. These harsh flavors are particularly noticeable if the coffee is consumed black.

Another problem of drying involves pastes and purees of fruit and vegetable material having a characteristic cellular structure for example tomato puree. If tomato puree is dried at elevated temperatures, the cellular structure is broken down and the product can only be reconstituted as a paste lacking the characteristic tomato texture. In addition, the drying renders the tomato solids discolored and caramelized.

Fruit juices are also difficult to dry effectively, often losing their characteristic freshness and flavor. "Instant" dried orange juice, for example, is generally regarded, as inferior to fresh or carton juice.

We have now discovered that one particular sugar can be incorporated in proteinaceous foodstuffs before they are heat treated and dried with the result that the protein is largely protected from denaturation so that the reconstituted product much more closely resembles the original. Similarly this sugar can be incorporated in fruit and vegetable purees and juices and the like, with retention of the freshness and structure of the original. In this respect the added sugar is considerably more efficient than sucrose or glucose, without rendering the product particularly sweet.

According to the present invention there is provided a method of drying a water-containing foodstuff or beverage at a temperature above ambient, by incorporating trehalose into the foodstuff or beverage which is to be dried.

Trehalose, α-D-glucopyranosyl-α-D-glucopyranoside, is a naturally occurring non-reducing disaccharide which is found in some organisms, both plant and animal, which can resist being dried. These organisms include brine shrimps cysrs, (Artemia salina), the resurrection plant (Selaginella lepidophylla) and baker's yeast (Saccharomyces cerevisiae). We have found that the addition of trehalose to proteinaceous foodstuffs enables them to be not only dried, but also heated at quite high temperatures, without significant denaturation. In general, the trehalose should be added to the foodstuff at a level giving a weight ratio of trehalose: protein of, for example. 1:2.5 to 1:15. Preferably the weight ratio Should be from 1:2.5 to 1:7.5. Thus, for example, whole milk contains 3.3% protein and can be efficiently stabilized by the addition of 0.5% by weight of trehalose, a ratio of 1:6.6 by weight. Whole egg containing 12.3% protein can be stabilized by addition of 3 to 5% by weight of trehalose, a weight ratio of about 1:2.5 to 1:4. Coffee extracts can be produced containing a solids content including 1 or 2% trehalose: a approximate weight ratio of 1:7 to 1:14 based on the protein content.

In cases where the protein content is small and/or not easily measurable and/or there is a cellular structure to preserve, for example fruit purees, then the trehalose can be added at a weight ratio of trehalose:non-fat solids of 1:5 to 1:100, especially 1:5 to 1:3. These ranges are also applicable to foodstuffs such as egg and milk. In the case of 0.5% trehalose in whole milk containing 3.3% protein, the total non-fat solids content is about 8%, giving a weight ratio of trehalose:non-fat solids of 1:16. Trehalose at 3% in whole egg containing about 26% solids gives a ratio of 1:8.7. Dried coffee solids containing 1 or 2% trehalose have a ratio of 1:50 to 1:100. Juices and purees can contain from 1 to 15% by weight of trehalose.

An additional advantage of incorporating trehalose is that, surprisingly, the speed of re-hydration is much increased over controls and over samples containing sucrose.

The following Examples illustrate the invention further:

EXAMPLE 1

Full Cream Milk

Fresh pasteurized whole milk was concentrated and spray dried in the presence of trehalose at 0.5% of the weight of the whole milk. From the same bulk supply of milk an untreated control sample was also processed.

Trehalose was added to the milk using simple agitation. The sample was concentrated to an industry standard of about 30% milk solids using, in this instance, a single-tube climbing film vacuum evaporator with a column temperature of from 40° C.–80° C.

The resulting concentrate was fed into a spray-drier with a chamber temperature of 175° C.–205° C. Outlet temperatures were in the region 85° C.–98° C.

The powder collected was rehydrated by the addition of sufficient cold water to achieve the status of fresh milk. It was noted that the sample containing trehalose was more easily re-wetted than the control. The trehalose sample was considered to have the organoleptic properties of fresh milk. This can be described as a "clean" lactic note. The texture was also more integrated and homogeneous. The control sample was more like the familiar reconstituted powder.

When heated, it was observed that the trehalose-containing sample had the characteristic aroma of heated fresh milk and formed a surface "skin". This is evidence of the milk proteins lactalbumin and lactoglobulin. This "skin" was not evident in the control sample indicating that these milk proteins had been denatured.

EXAMPLE 2

Hens' Egg

Fresh whole hens' egg is particularly susceptible to high temperature dehydration, e.g. spray-drying. The resultant product is significantly inferior in performance and organoleptic quantities to the original raw material.

In this experiment 3% trehalose by weight was added to fresh whole hens' egg. This was achieved by whisking the egg and the trehalose to form an even blend.

The mixture was spread onto glass drying plates and dried in a warm air drying oven. Temperatures were from 45° C.–50° C. Samples of egg were prepared Without trehalose and dried alongside the test samples to form controls. The samples were dried until all moisture had been removed and only egg solids remained. The final dried egg flakes were ground to produce a fine powder which was easily reconstituted.

The powders were then rehydrated with cold water to return to a theoretical natural egg solids ratio. It was noted that the sample containing trehalose went more readily into a smooth homogeneous dispersion.

The egg solutions were tested in 2 ways:

1. preparation of "scrambled" egg

Samples containing 50 g of egg solution blended with 20 g of fresh milk were placed in a 650 w microwave and cooked for 2 mins on full power the samples being stirred at 30 second intervals.

The test sample with trehalose had the aroma and texture akin to that of fresh scrambled egg. The proteins had readily coagulated producing a soft pleasing texture with a pale yellow color. The control sample did not coagulate totally, producing a grey, rubbery texture which had an unpleasant aroma and eating quality.

2. Preparation of Yorkshire Pudding Batter

A batter was made consisting of 40 g of egg solution, 40 g plain flour, 100 g fresh milk and 2 g of salt.

The batter was poured into pre-heated tins and baked for 20 mins at 200° C. together with a control batter made from the untreated dried egg.

Care was taken to ensure that the baking conditions were the same for all samples.

The finished puddings were examined for lift, volume and texture. The samples containing trehalose had an increased volume and a more even shape. The eating quality was superior to the control.

Conclusion

These results indicate that the proteins within the control sample had been substantially denatured, whereas the protein activity of the trehalose sample was much closer to that of fresh egg.

EXAMPLE 3

Coffee

Roast coffee beans were finely ground, hot water and trehalose added, then the whole subjected to a temperature of 120° C., in order to effect the extraction of the soluble solids. The insoluble solids were then removed leaving a solution containing between 30%–55% solids depending upon the efficiency of the extraction process.

The solution was spread onto glass drying plates and dried in a warm air drying oven. Temperatures were from 45° C.–50° C. Samples of coffee were prepared without trehalose and dried alongside the test samples to form controls.

Samples were prepared containing trehalose at between 0.5% and 5% by weight of the ground coffee weight prior to extraction Dried samples were then reconstituted to form a potable coffee solution and assessed together with the control sample. The extraction and drying methods used had produced a dark solution with very pronounced bitter notes in the control sample. The samples containing trehalose were lighter in color and had considerably less after taste with a lower evidence of "bitter" notes. Although trehalose performed reasonably well at 0.5%, the sample at 1% was very good and was, in fact, not significantly better than those at higher levels.

As with other experiments, the trehalose sample was much closer to the original pre-dried material in overall flavor profile than the control sample. No attempt was made in this particular test to identify the compounds responsible for the "bitter" flavors that occurred.

EXAMPLE 4

Tomato

Spray-dried tomato powder is widely used in the Food Industry, It forms the basis for a number of dry-mix sachet and carton products—soups, sauces, casserole-mixes drinks and various cooking-aid products.

The reconstituted dried material is significantly inferior to the "wet" preserved product, e.g. canned and frozen concentrates pasteurized or aseptically processed concentrates, juice or passata.

The dried material currently available does not recover, when reconstituted, the cellular structure or color typical of the "wet" preserved products. This can also be said of the more sophisticated and expensive product obtained by vacuum freeze-drying (lyophilisation).

In this experiment, raw frozen Italian tomato puree with a solids content (T.S.S) of 28% by Weight was used.

The tomato was allowed to thaw and samples were prepared containing trehalose at levels between 1%–5% w/weight, the trehalose being easily incorporated in dry form into the weighed sample of tomato. The puree was spread onto glass drying plates and dried in a warm air drying oven. Temperatures were from 50° C.–100° C. Samples of tomato were prepared without trehalose and dried alongside the test samples to form controls. The dried samples were reconstituted to reform to the original solids content.

The severity of the drying method used meant that the products had suffered loss of color, most samples being dark red to black. However, the sample containing 5% trehalose had maintained color the best. It also when rehydrated, completely recovered the cellular or 3-dimensional molecular structure of the original material. The flavor had also been "protected" being less caramelized than the control.

The control sample when rehydrated formed a dark-red slurry with a prominent caramelized flavor. It did not resemble the raw material in any way.

EXAMPLE 5

Hens' Egg (Comparative)

The relative benefits of trehalose were compared with an alternative disaccharide (sucrose) and a monosaccharide (dextrose).

Samples were prepared by taking measured amounts of blended hens' egg and addition 5% by weight of sucrose, dextrose and trehalose.

The three separate samples were spread onto glass drying plates and dried in a warm air drying oven. Temperatures were from 40° C.–50° C. Samples of egg were prepared without addition and dried alongside the test samples to form controls. The samples were dried until 25% of the original weight remained, in theory removing all moisture (fresh whole hens' egg contains 74.8% water —ref: McCance & Widdowson ed. A. A. Paul and D. A. T. Southgate. H.M.S.O 4th Edn.).

When cool, each dried egg sample was ground into a fine powder and rehydrated with cold water to return to the original starting weight. The samples were left to hydrate for 1 minute and then whisked lightly to check for foaming ability.

The three sugar-containing samples all foamed readily on being whisked. All had a more viscous and "integrated" appearance as compared with the control with the trehalose sample performing best in this respect.

The control sample was paler in color, had an uneven precipitated appearance and would not foam at all.

All of the samples were then tested as "scrambled" egg.

10% by weight of fresh milk was added to the samples. Each was then cooked in a microwave (650 w) at half power for 90 seconds total interrupted for stirring the sample at 30, 45 ,60, 70 and 80 seconds.

The control sample did not coagulate fully and had a very firm uneven texture with a strong "cooked egg" aroma. The flavor was typical of a "processed" egg product.

The samples containing sucrose and dextrose were both softer in texture and more even in color. Both still had the unpleasant "cooked egq" aroma however, and were excessively "sweet" tasting. The trehalose sample had a similar soft texture and even color. The striking difference being in the aroma and taste. The trehalose sample was spontaneously described by the tasters as having a "natural" or fresh flavor. The overall taste was light and pleasing as opposed to th harsh cooked flavor of the control, or the "cooked" aroma of the other samples.

EXAMPLE 6

Orange juice concentrate containing 7.5% by weight orange solids and 15% by weight trehalose was spray dried (air inlet temperature 170° C.; air outlet temperature 80° C.-84° C.; atomizer speed 40,000 rev/min). For evaluation, the dried powder was diluted 1 part to 6 parts water. The trehalose-containing samples rehydrated much more readily the control samples containing maltodextrin as carrier. They had a better appearance and flavor.

I claim:

1. A method of drying a water-containing food material to be made into or used as food, comprising the steps of incorporating an effective amount of trehalose into the food material and drying said food material at a temperature above ambient temperature.

2. A method according to claim 1, wherein the food material is proteinaceous and the trehalose is added at a weight ratio of trehalose:protein of 1:2.5 to 1:15.

3. A method according to claim 2, wherein the trehalose ratio is 1:2.5 to 1:1.75.

4. A method according to claim 1, wherein the trehalose is added at a concentration of from 0.5 to 15% by weight.

5. A method according to claim 1, wherein the food material comprises milk or egg.

6. A method according to claim 1, wherein the food material comprises a juice, juice concentrate, paste or puree of fruit or vegetable.

7. A dried food material to be made into or used as food comprising a product of the method according to claim 1.

* * * * *